US011644682B2

(12) United States Patent
O'Toole et al.

(10) Patent No.: US 11,644,682 B2
(45) Date of Patent: May 9, 2023

(54) SYSTEMS AND METHODS FOR DIFFRACTION LINE IMAGING

(71) Applicant: CARNEGIE MELLON UNIVERSITY, Pittsburgh, PA (US)

(72) Inventors: Matthew O'Toole, Pittsburgh, PA (US); Mark Sheinin, Pittsburgh, PA (US); Srinivasa Narasimhan, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 262 days.

(21) Appl. No.: 17/178,855

(22) Filed: Feb. 18, 2021

(65) Prior Publication Data
US 2021/0389601 A1 Dec. 16, 2021

Related U.S. Application Data

(60) Provisional application No. 63/037,888, filed on Jun. 11, 2020.

(51) Int. Cl.
*G02B 27/42* (2006.01)
*G02B 5/18* (2006.01)
(Continued)

(52) U.S. Cl.
CPC ........ *G02B 27/4233* (2013.01); *G01B 11/002* (2013.01); *G01B 11/03* (2013.01); *G02B 5/18* (2013.01); *G02B 27/0944* (2013.01)

(58) Field of Classification Search
CPC ............. G02B 27/42; G02B 27/4205; G02B 27/4233; G02B 5/18; G02B 27/0944;
(Continued)

(56) References Cited

U.S. PATENT DOCUMENTS

| 5,737,456 A * | 4/1998 | Carrington | ............. | B82Y 15/00 |
| | | | | 382/128 |
| 8,831,316 B2 * | 9/2014 | Tyurina | ................... | G06T 5/003 |
| | | | | 382/129 |

(Continued)

FOREIGN PATENT DOCUMENTS

| WO | WO-2015195417 A1 * | 12/2015 | ............. A61B 3/113 |
| WO | WO-2019017841 A1 * | 1/2019 | ............. G06T 5/003 |
| WO | WO-2021229575 A1 * | 11/2021 | |

OTHER PUBLICATIONS

Weinberg et al., "100,000 frames-per-second compressive imaging with a conventional rolling-shutter camera by random point-spread-function engineering", Cornell University Library [online], Arxiv. org, Apr. 20, 2020, 5 pages.
(Continued)

*Primary Examiner* — Gordon J Stock, Jr.
(74) *Attorney, Agent, or Firm* — KDW Firm PLLC

(57) ABSTRACT

A novel class of imaging systems that combines diffractive optics with 1D line sensing is disclosed. When light passes through a diffraction grating or prism, it disperses as a function of wavelength. This property is exploited to recover 2D and 3D positions from line images. A detailed image formation model and a learning-based algorithm for 2D position estimation are disclosed. The disclosure includes several extensions of the imaging system to improve the accuracy of the 2D position estimates and to expand the effective field-of-view. The invention is useful for fast passive imaging of sparse light sources, such as streetlamps, headlights at night and LED-based motion capture, and structured light 3D scanning with line illumination and line sensing.

35 Claims, 14 Drawing Sheets
(14 of 14 Drawing Sheet(s) Filed in Color)

(51) Int. Cl.
  *G02B 27/09* (2006.01)
  *G01B 11/00* (2006.01)
  *G01B 11/03* (2006.01)

(58) Field of Classification Search
  CPC ......... G01B 11/002; G01B 11/03; G06T 7/73;
  G06T 2207/10024; G06T 2207/20084;
  G06T 2207/30204
  See application file for complete search history.

(56) References Cited

U.S. PATENT DOCUMENTS

| | | | |
|---|---|---|---|
| 9,826,226 B2* | 11/2017 | Kunkel | H04N 17/02 |
| 2007/0221822 A1 | 9/2007 | Stein et al. | |
| 2011/0064270 A1* | 3/2011 | Lee | G06T 7/73 |
| | | | 382/103 |
| 2016/0025568 A1 | 1/2016 | Stein | |
| 2018/0255240 A1* | 9/2018 | Kato | H04N 5/349 |

OTHER PUBLICATIONS

International Search Report and Written Opinion for International Patent Application No. PCT/US2021/034850 dated Sep. 14, 2021, 12 pages.

* cited by examiner

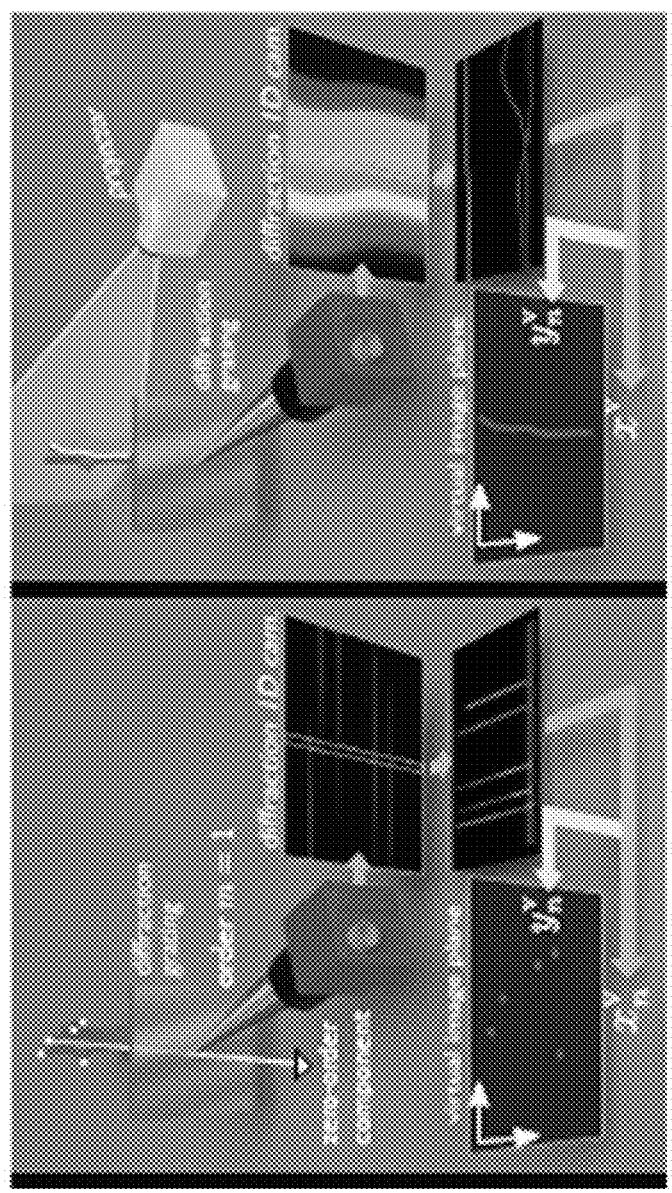
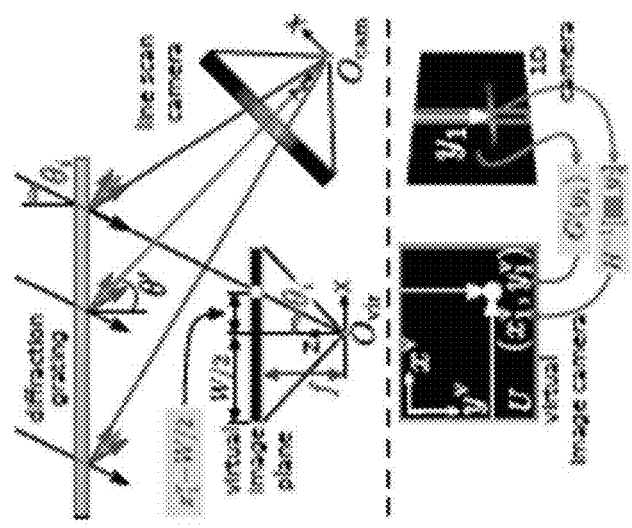
FIG. 4A
FIG. 4B

SYSTEMS AND METHODS FOR DIFFRACTION LINE IMAGING

RELATED APPLICATIONS

This application claims the benefit of U.S. Provisional Patent Application Ser. No. 63/037,888, filed Jun. 11, 2020, the contents of which are incorporated herein in their entirety.

GOVERNMENT INTEREST

This invention was made with government support under Awards Nos. 1730147 and 1900821 issued by the National Science Foundation and Award No. HR0011-16-C-0025 issue by DARPA/Wisconsin (A022264). The government has certain rights in this invention.

BACKGROUND OF THE INVENTION

Light passing through a diffraction grating is dispersed as a function of wavelength (measured color). When imaged by a 2D camera, the dispersed light manifests as colorful streaks. Such diffraction gratings are commonly used to create artistic effects like the star-filter commonly used in photography when capturing bright light sources such as vehicle head-lamps and streetlights at night, as shown in FIG. 1B. The micro-structure of the grating influences the shapes and number of streaks. The brightness and appearance of the streaks depends on the 2D spatial locations of the sources in the image. Diffraction gratings are used in many imaging and scientific applications, including spectroscopy, multi-spectral sensing and rainbow particle velocimetry.

SUMMARY OF THE INVENTION

When light sources or bright projections of light, as shown in FIG. 1A, are viewed through a transmissive diffraction grating, the incoming light is dispersed as a function of wavelength (measured color). When imaged by a 2D camera, the dispersed light manifests as colorful streaks, creating streaks of light on the camera's sensor plane, as shown in FIG. 1B. If a one-dimensional color sensor, shown as the dotted green line in FIG. 1B, or a very few rows in a 2D sensor, intersects with these streaks, the measured colors can be used to efficiently determine the 2D spatial positions for each light source or projected line pixel at high frame rates. For example, the central column in the right-most diffraction image in FIG. 1B can be sensed at 2.6K fps by a camera.

Disclosed herein is a novel class of imaging systems that use one or more diffraction gratings in conjunction with line (1D) sensors. Line sensors can yield 2D and 3D information. Line sensors offer several advantages over 2D sensors, namely, high frame rates, high dynamic range, and additional on-chip computation near the sensing area. As a result, this imaging approach results in fast 2D positioning and 3D reconstruction in many applications, including, for example, night imaging, LED-based motion capture, and industrial product scanning.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 4A-B are a schematic representation of the components of the present invention.

DEFINITIONS

As used herein, the term "light source" refers to an illuminated object in a scene, wherein the object is illuminated either by emitting its own light or by reflecting light from another source.

As used herein, the term "X-Y position" or "X-Y coordinates" refers to any orientation of coordinates in an 2d plane and is not meant to be limited to coordinate system having axes oriented horizontally or vertically.

DETAILED DESCRIPTION

As a starting point in the explanation of the invention, a detailed image formation model for a collimated beam of light incident on a line sensor via a diffraction grating will be presented. This model maps a 3D point source to a 2D X-Y location on a virtual image plane and depends on the relative placement of the line sensor with respect to the diffraction grating and the line sensor's spectral response.

A learning-based algorithm is presented for estimating the 2D locations of a sparse set of light sources or a line illumination projected onto a 3D scene. An analysis is provided of the uncertainty of the 2D positioning and the achieved field-of-view. To improve positioning accuracy significantly, the imaging system is extended to include multiple diffraction gratings and/or an additional cylindrical lens. Finally, the approach is extended to multiple line sensors (or using multiple regions of interest in a 2D sensor) to increase the field-of-view of the imaging system.

The approach of the present invention can be thought of as a variant of compressive line sensing with direct decoding of 2D positions, in place of computationally intensive and noise-prone decoding algorithms.

The present invention is explained in terms of two applications: (1) the passive imaging of light sources; and (2) Structured Light Line Scanning.

Figures 1A, 1B:
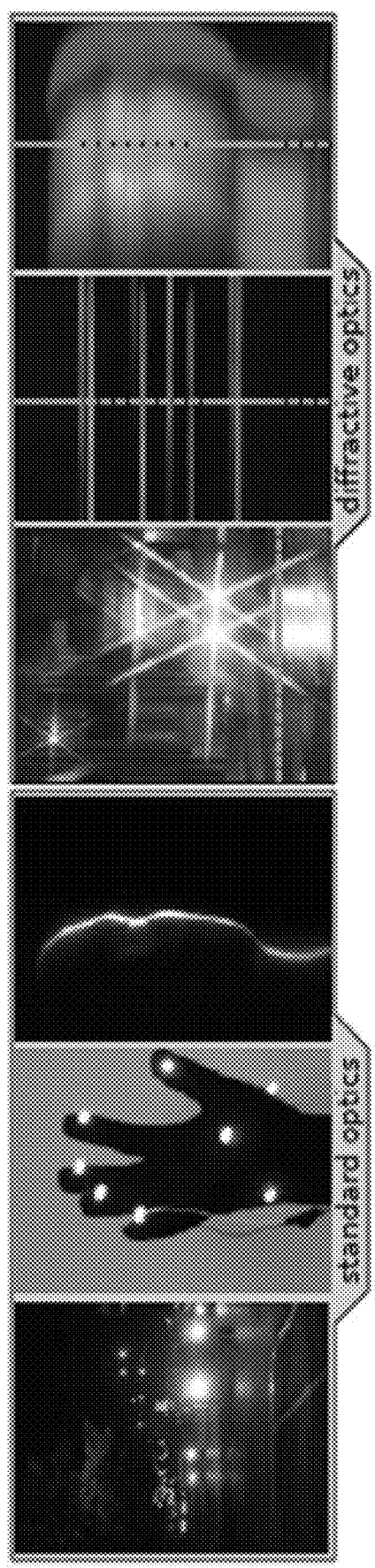
FIGS. 1A-B contrast viewing light sources or bright projections of light through standard optics versus through a transmissive diffraction grating.
Figures 2A, 2B, 2C:
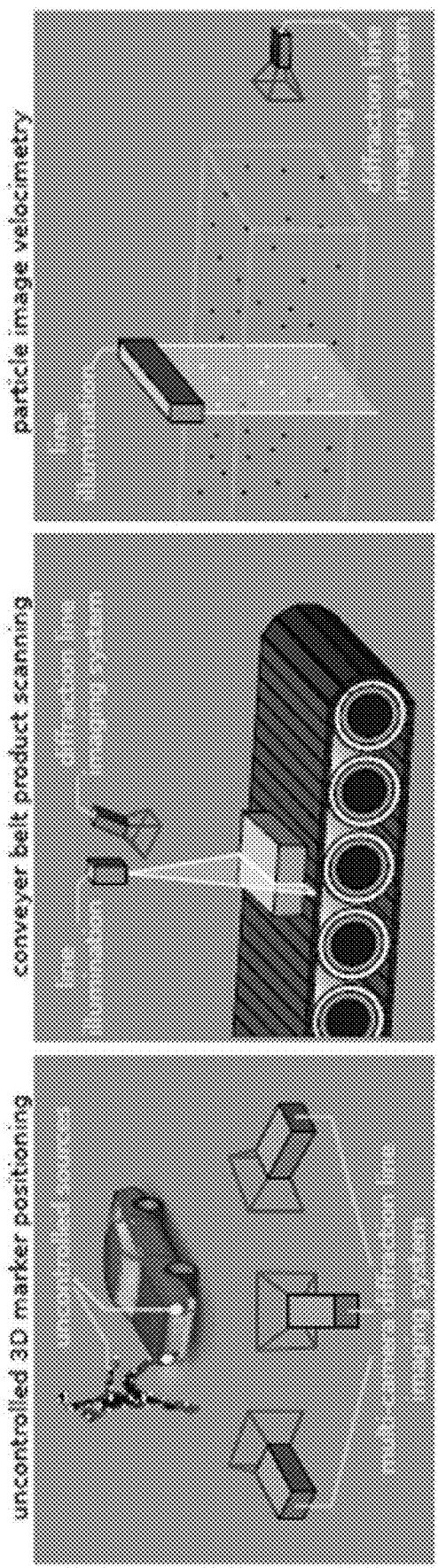
FIGS. 2A-C are a graphic representation of various diffraction line imaging applications.

Passive Imaging of Light Sources. Night scenes include a variety of light sources such as streetlamps, vehicle headlamps, taillights, turn signals, and bicycle lights, as shown in FIG. 1A. Because of their distinctive appearances, light sources can serve as strong features to track, reconstruct and interpret the scene and objects of interest at night. As an example, the flicker of sources may be used to determine the AC phase of electrical circuits and even analyze power grids. In another example, the glows around streetlamps may be used to reveal the weather condition (fog, haze, rain) and visibility. Finally, motion capture systems often attach light sources (LEDs) to estimate the object's motion in 3D. Capturing sparse light sources with 2D sensors wastes pixel resources and limits the image acquisition rate. The present invention is able to estimate 2D light source positions from line images at high frame rates (up to 2200 fps in the system described herein). In contrast to previous works that use line sensors or spatio-temporal illumination to light a subject, one embodiment of the present invention is based purely on passive observation of light sources without requiring special modulation or synchronization. FIG. 2A shows an example of the passive imaging of light sources, specifically, unmodulated LEDs and car headlights.

Structured Light Line Scanning: Structured light 3D scanning often projects and sweeps an illumination line across a scene. A 2D camera observes the intersection of the line with the 3D scene. The 3D scene is then reconstructed by intersecting the pixel ray with the plane of illumination. In this scenario, most of the pixels in the 2D camera are not used, thereby limiting the acquisition rate due to data transfer bandwidth. The scene can be accurately reconstructed using a line light source and diffraction line imaging. The image acquisition of the present invention is limited mainly by the SNR (and hence exposure time) and not by the bandwidth of data transfer from a 2D sensor. This embodiment of the present invention represents a first instance of a structured light system with a 1D source and a 1D camera. This was not possible before and either a 2D projector and/or a 2D camera was required. Further, line illumination and imaging is significantly more energy efficient than 2D illumination and imaging. If the line source is bright enough, it is possible to achieve scan rates of tens of thousands of lines per second, making this approach very useful in industrial/logistics scanning applications. FIG. 2B shows an application of structured light scanning in which objects on a conveyer belt are illuminated by line illumination and scanned.

Diffraction Gratings

The approach of the present invention to light source positioning starts by exploiting diffraction, which is a wavelength-dependent optical phenomenon that causes light to bend (i.e., diffract) when passing through and around obstacles and slits. A diffraction grating is an optical element having periodic structures forming slits that produces diffraction patterns, useful in scientific applications such as spectroscopy, holography and hyper spectral imaging.

Figures 3A, 3B, 3C:
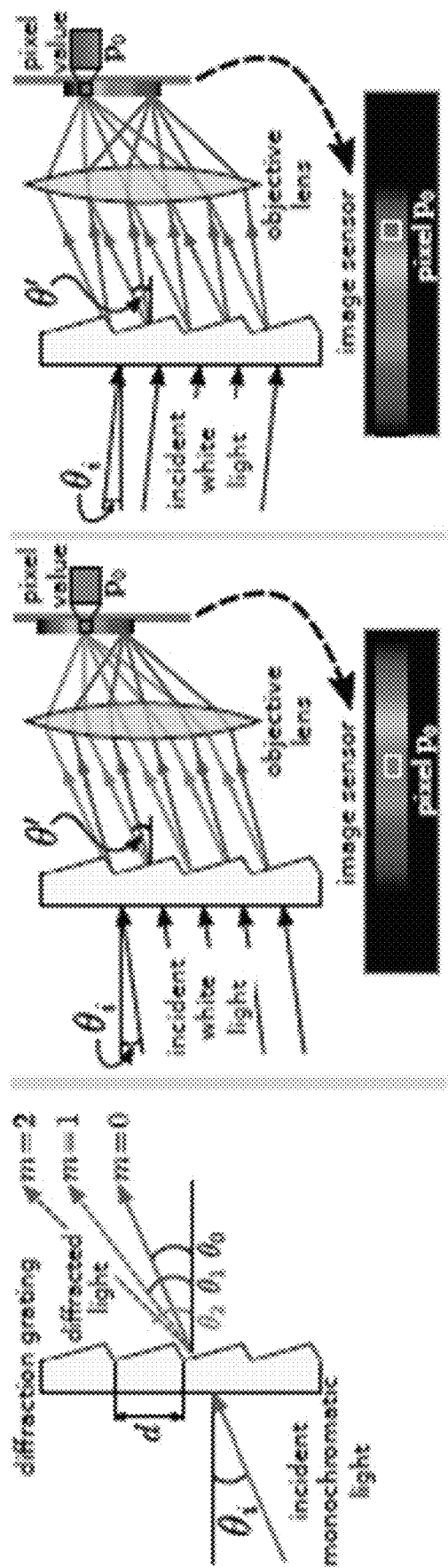
FIGS. 3A-C are a graphic representation of the diffraction-based 2D positioning method of the present invention.

FIG. 3A shows a grating consisting of a periodic structure repeated every d microns. A monochromatic collimated beam passes through the diffraction grating. The grating diffracts the beam yielding new beam directions according to Eq. (1). In a transmissive grating, incident light diffracts according to:

$$d[\sin(\theta_m) - \sin(\theta_i)] = m\lambda \quad (1)$$

where:
$\theta_m$ is the angle of the $m^{th}$ diffraction order;
$\theta_i$ is the angle of incident light;
d is the distance between the periodic structures in the diffraction grating;
m is the diffraction order; and
λ is the wavelength, in microns.

In Eq. (1), m=0 corresponds to the $0^{th}$-order component, which passes unbent through the grating, while each wavelength disperses into a unique angle for m≠0, producing the characteristic point spread function (PSF) which appears as a rainbow color streak, as shown in FIG. 1A. Per diffraction order m, each wavelength is diffracted in a different spatial direction. When imaged by a camera, this results in a vertical rainbow pattern on the image plane. Here, pixel $p_0$ measures the energy of some wavelength in the green range.

For a fixed $\theta_i$, a camera imaging the light exiting the diffraction grating maps each wavelength onto unique sensor position. This mapping is the basis for spectroscopy, the purpose of which is the spectral analysis of the incident light. For example, echelle spectroscopes use combinations of high-dispersion and low-dispersion gratings to precisely measure the intensity of thousands of different wavelengths.

In contrast, the present invention inverts this process, using color to efficiently and precisely recover the incident direction of light $\theta_i$ for unknown light sources. FIG. 3C shows that shifting the incoming beam's direction results in a spatial shift of the spectral pattern on the image plane. Each incoming beam direction maps a unique wavelength to $p_0$. Thus, the color value at $p_0$ provides information about the incident angle $\theta_i$. Consider light exiting the diffraction grating at an angle θ' belonging to the first diffraction order (i.e., m=1). Suppose that, on the camera image plane, light exiting at θ' is focused at some corresponding camera pixel coordinate $p_0$, as illustrated in FIG. 3B. Then, from Eq. (1), the color (wavelength) measured at $p_0$ is:

$$\lambda(\theta_i) = d[\sin(\theta') - \sin(\theta_i)] \quad (2)$$

and depends on the incident light direction $\theta_i$. Thus, for a fixed θ', the measured color at $p_0$ indicates the direction of incident light.

Diffraction-Based 2D Positioning

The diffraction equation (Eq. (2)) has two key properties that enable computing the direction of scene light sources. First, the function $\lambda(\theta_i)$ is an injective (i.e., one-to-one) function across the domain $\theta_i \in [-p_i/2, \theta']$. The inverse of $\lambda(\theta_i)$ is therefore given by:

$$\theta_i(\lambda) = \sin^{-1}\left(\sin(\theta') - \frac{\lambda}{d}\right) \quad (3)$$

Second, Eq. (2) and its inverse do not depend on the intensity of light. This property makes the imaging system of the present invention effectively invariant to the incident light intensity and, more specifically, its spectral characteristics. Note that this assumes no under- and over-saturated pixel measurements.

A basic schematic of the optical system of an embodiment of the present invention is shown in FIG. 4A (top view) and FIG. 4B (front view). The system consists of a diffraction grating and a color line scan camera. The line scan camera is positioned vertically, containing pixels along the Y-direction (in the camera's reference frame) denoted by the single coordinate y. Note that the terms "line scan camera" and "1D camera" are used interchangeably herein. For ease of explanation, the line scan camera's image plane is sometimes referred to as the full 2D image, had the camera been equipped with a standard 2D sensor.

With reference to FIG. 3A, the first order diffraction is measured by an RGB line scan camera. The measured colors are used to estimate the 2D light source positions. Light incident on the diffraction grating is dispersed as a rainbow streak onto the sensor. FIG. 3(B) shows the situation when the scene contains sparse light-sources, as would be the case, for example, for motion capture. In this case, the line scan camera contains several spikes. Spike location along the vertical line scan camera encodes the vertical coordinate in the virtual image plane, while the spike color encodes the horizontal coordinate. FIG. 3(C) shows 3D scanning using line projection. The projected line yields a piece-wise continuous signal in the line scan camera.

The system can then track both 2D spatial coordinates. For each point source, the vertical source coordinate is trivially measured by the rainbow's streak position along the 1D vertical sensor (i.e., $y_1$ in FIG. 4A). Computing the horizontal coordinate of the source amounts to computing the $\theta_i$ angle, which involves three simple steps: (1) measure the response in RGB space; (2) compute the dominant wavelength $\lambda$ that produces the RGB signal; and (3) evaluate the inverse function $\theta_i(\lambda)$. Note that this procedure requires the light sources to be sufficiently broadband, such that the RGB measurement is non-zero for the given incident angle $\theta_i$ and the corresponding wavelength $\lambda(\theta_i)$.

As previously mentioned, two types of imaging regimes are addressed: (1) sparse light sources. That is, scenes having a sparse set of point sources distributed across the image plane, as shown in FIG. 4B; and (2) structured light line scanning. That is, scenes illuminated by a vertically projected line, which yields a vertical curve on the image plane, as shown in FIG. 4C.

3D scanning using a projected line can be implemented in various ways. The projected line (i.e., a plane in space) can either be swept across a static object by a projector or can have a fixed direction while the object moves through the plane, for example, by placing the object on a conveyor belt or turn table.

Image Formation Model

The model connecting the projection of light from 3D positions in space onto a 2D virtual camera image plane is derived here. The line scan camera, modeled as a pinhole, is set to image the first-order diffracted light from the scene. Let $O_{cam}$ denote the position and orientation of the line scan camera with respect to the diffraction grating. As shown in FIG. 4A, a virtual image plane U is defined with pixel coordinates $p^v=(x^v, y^v)$, that belong to a virtual 2D camera positioned at $O_{vir}$.

Figure 5:
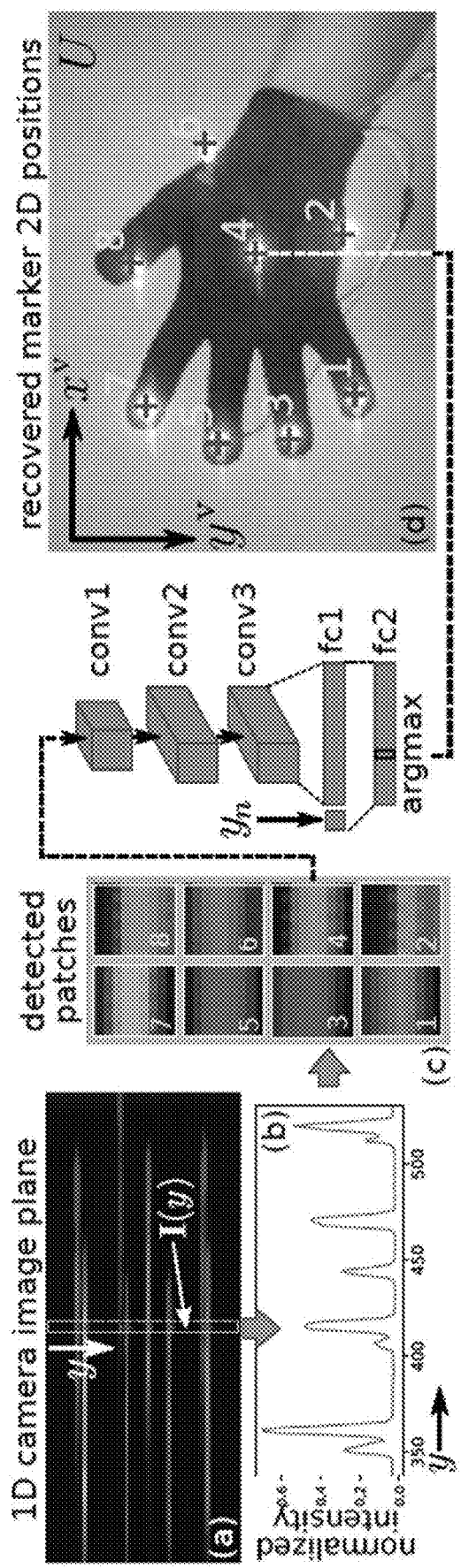
FIG. 5 shows a method for recovering sparse point sources using a convolutional neural network.

The model for a single point source indexed by n=1, having homogeneous world coordinates $w_4 \equiv [X, Y, Z, 1]^T$ is first described. On the image plane of the line scan camera, the PSF of the point source creates a holographic image in the shape of a horizontal rainbow line, as shown in FIG. 1B and FIG. 5. The line sensor of the camera is orthogonal to the rainbow line, intersecting it over a few pixels centered at $y_1$. The geometric relationship between $y_1$ and the corresponding virtual image coordinate $y_1^v$ is:

$$y_1^v = c(y_1) \quad (4)$$

Neglecting distortions that arise from light entering at highly oblique angles, the $y_1$ coordinate of the rainbow line is given by standard projective geometry:

$$\gamma \begin{pmatrix} y_1 \\ 1 \end{pmatrix} = \begin{pmatrix} 0 & 1 & 0 \\ 0 & 0 & 1 \end{pmatrix} P w_1 \quad (5)$$

where:
P is the projection matrix of the camera; and
$\gamma$ is an arbitrary scale factor.
In turn, since the Y-axes of both the virtual and line sensors are identical, G can be approximated by an affine transformation.

As seen in of FIG. 4A, the angle of the incident light with respect to the grating can be expressed as:

$$\theta_i(x_i^v) = \tan^{-1}\left(\frac{\left[x_t^v - \frac{W}{2}\right]}{f}\right) \quad (6)$$

where:
$f$ is the focal length of the virtual camera in pixel units; and
W is the virtual image plane width.
Combining this with Eq. (3) yields:

$$\lambda(x_i^v) = d\left(\sin(\theta') - \sin\left[\tan^{-1}\left(\frac{\left[x_t^v - \frac{W}{2}\right]}{f}\right)\right]\right) \quad (7)$$

The RGB intensity measured by the camera is modeled as:

$$I_\sigma(y_1) = T\alpha_\sigma[\lambda(x_i^v)]s[\lambda(x_i^v)] \quad (8)$$

where:
T is the exposure time;
$\alpha_\sigma(\lambda)$ is the camera's spectral response function (grayscale/Joule) for every color channel;
$\sigma \in \{R, G, B\}$; and
$s(\lambda)$ represents the spectral radiant flux of the source (Joule/sec) falling on $y_1$.

In Eq. (8) it is assumed that each pixel y integrates a very narrow band of wavelengths due to the very narrow field-of-view.

Normalizing the 3×1 vector $I_\sigma(y_1)$ by its $L^2$ norm removes the dependence on exposure time and source spectral flux:

$$\bar{I}_\sigma(y_1) = \frac{I_\sigma(y_1)}{\|I_\sigma(y_1)\|_2} = \frac{\alpha_\sigma[\lambda(\theta' x_t^v)]}{\|\alpha_\sigma[\lambda(\theta' x_t^v)]\|_2} \equiv H_\sigma(x_i^v) \quad (9)$$

Finally, $x_i^v$ is given by inverting Eq. (9):

$$x_i^v = H^{-1}[\bar{I}_\sigma(y_1)] \quad (10)$$

The model in Eqs. (6-10) assumes that only a single source is predominately projected onto every line camera pixel. Recovering $x_i^v$ is described next.

Recovering Horizontal Coordinates

Computing $H^{-1}$ in practice requires accounting for various factors—point sources not truly at infinity, 1D camera-diffraction geometry, the line scan camera's radiometric response, sensor saturation, and more. Due to camera lens distortions, sensor-diffraction grating misalignment, and deviations to Eq. (1) due to incident light in oblique angles, $H^{-1}$ generally depends on $y_1$. Note that Eq. (1) strictly holds when the grating groves are perpendicular to the incidence plane. The incidence plane is the plane containing the beam direction and the normal to diffraction grating plane. These factors make computing $H^{-1}$ directly a laborious task. Instead, a learning-based approach may be used.

A neural network can be trained to approximate $H^{-1}$, denoted by $\hat{H}^{-1}$. The network receives sensor color measurements in RGB space along with y, termed RGBy, and outputs the $x^v$ coordinates. In practice, different network architectures may be used for sparse points and vertical line projection.

Recovering Sparse Point Sources

For sparse sources, a convolutional neural network (CNN) can be trained. The network, denoted by maps $H_{point}^{-1}$ from a small patch into a predefined discrete set of possible $x^v$ coordinates.

The process is shown in FIG. 5. In FIG. 5(a), a plurality of rainbow streaks are incident on the line scan camera image plane. FIG. 5(b) shows an average profile of a subset of columns shown in FIG. 5(a), representing the signal received by the line scan camera. FIG. 5(c) shows small 8×9 patches capturing the peak response within a narrow region of interest (ROI) of the sensor. The position of this patch is given by coordinate $y_n$. FIG. 5(d) shows each detected patch and the coordinate $y_n$ is processed by the trained CNN to obtain a horizontal coordinate $x_n^v$. The 2D color glove image from a helper camera is shown for reference only.

In a preferred embodiment of the invention, the neural network consists of three convolutional layers (channel widths 20, 50, 50 respectively) followed by two fully connected layers, as shown in FIG. 5(c). Note that the described CNN is exemplary only and that other architectures for the CNN are possible without deviating from the scope of the invention.

Consider a scene with N point sources, indexed by n=1, 2, ..., N. Let Q denote the number of vertical pixels in the line scan camera. A line scan camera can be a few pixels wide in the horizontal direction as well (e.g., due to RGB Bayer color filter). Supposed the line scan camera has a width of 8 pixels. Thus, given an 8×Q color image from the line scan camera, the first step is to identify the rainbow line positions from peaks in the sensor measurement I(y). Then, for every detected rainbow with coordinate $y_n$, provide the CNN with a normalized small 8×9 image patch $\Omega(y_n)$ vertically centered at $y_n$, and concatenate the coordinate $y_n$ with the input to the first fully connected layer. Note that normalizing an 8×9 patch consists of dividing all RGB pixel values by a scalar. For example, for $L^\infty$, $\tilde{I}[\Omega(y_m)]=I[\Omega y_m)]/\max_{RGB}$ where $\max_{RGB}$ is the maximum value across all patch pixels and color channels.

The network outputs a W×1 vector $s_n$ with scores per possible horizontal virtual image location. Then, are recovered as:

$$x_n^v = \arg\max(S[s_n]) \quad (11)$$

where:
S is a softmax function.

The training dataset consists of ground truth 2D coordinates captured with a 2D helper camera, line scan camera coordinates $y_m$, and the corresponding image patches $\tilde{I}[\Omega(y_m)]$:

$$\{x_m^{v,GT}\}_{m=1}^M \leftrightarrow \{\tilde{I}[\Omega(y_m)], y_m\}_{m=1}^M \quad (12)$$

where:
M is the number of training examples.
The training loss is given by:

$$L = \frac{1}{M}\sum_{m=1}^M BCE(S[s_m], D[x_m^{v,GT}, \sigma]) \quad (13)$$

where:
BCE(•,•) is the binary cross entropy function; and
D(•) generates a Gaussian probability distribution with mean $x_m^{v,GT}$ and standard deviation σ.

Intuitively, the binary cross entropy function drives the output distribution $S[s_m]$ to match the desired distribution, which is a narrow Gaussian centered at $x_m^{v,GT}$. Using a Gaussian instead of a Delta function for D(•) provides a tolerance for small deviation due to image noise. FIG. 4 shows an example result.

Recovering a Vertically Projected Line 3D reconstruction relies on an aggregate of many continuous measurements through interpolation. Thus, here the network implements regression. Let the 3×1 RGB vector $u_y$ denote the mean color of patch $\Omega(y)$. $u_y$ is computed by averaging $\Omega(y)$ over the spatial domain.

The network $H_{line}^{-1}$ is fed with a normalized $u_y$ along with y and outputs a continuous scalar approximation for $x^v$:

$$x^v = \begin{cases} H_{line}^{-1}\left(\frac{u_y}{\|u_y\|_2}, y\right), & \text{if } u_y \in \mathcal{A} \\ \text{none}, & \text{otherwise} \end{cases} \quad (14)$$

where
$\mathcal{A}$ is a subspace of "valid" RGB input values such that:

$$\mathcal{A} = \{u_y : \|u_y\|_{inf} > t, \|u_y\|_0 > 1\}$$

where:
t is a predefined intensity threshold.

Subspace $\mathcal{A}$ excludes low intensity (and thus noisy) measurements as well as wavelengths that map to only a single-color channel and thus can't be distinguished after normalization. The latter occurs at the edges of the rainbow streak (i.e., deep reds and blues).

In preferred embodiments, the network consists of four fully connected layers of size 300 and is trained using the Huber loss. The training dataset is:

$$\{x_m^{v,GT}\}_{m=1}^M \leftrightarrow \{u_m, y_m\}_{m=1}^M \quad (15)$$

and was obtained by scanning a vertical line on a white wall.

Expanding the FOV using Multiple ROIs

Figure 6:
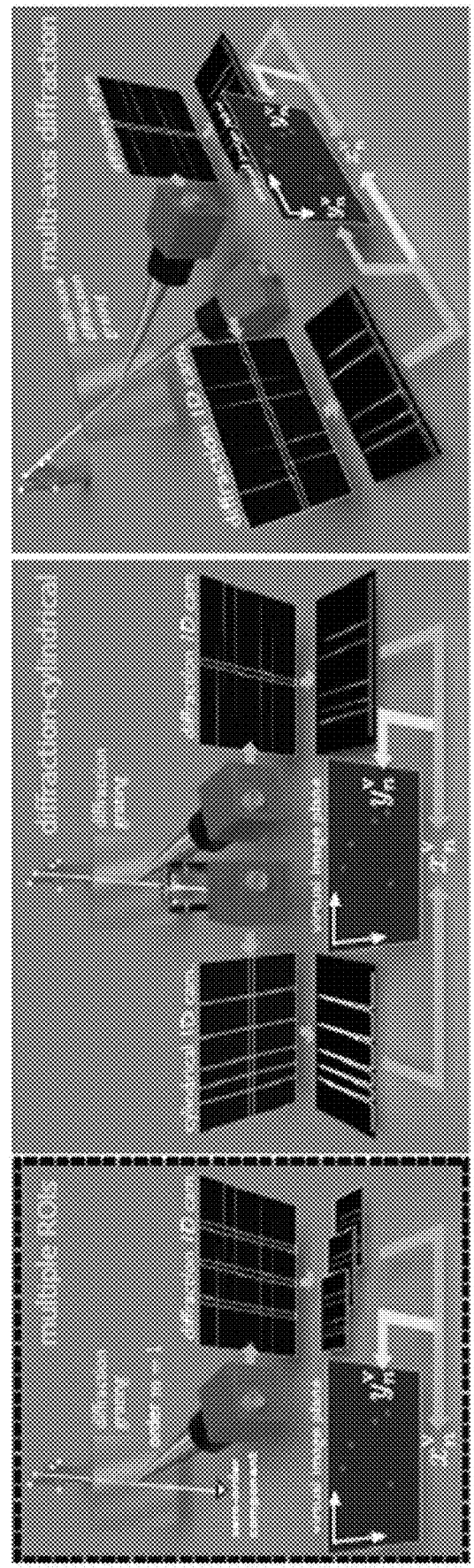
FIGS. 6A-C show a method utilizing a 2D camera having multiple ROIs; a first alternate embodiment utilizing a horizontal cylindrical lens; and a second alternate embodiment using multi-axis diffraction, respectively.

Using multiple 1D regions-of-interests (ROIs) in a 2D camera has the advantage of increasing the field-of-view (FOV) without significant sacrifice of acquisition speed. In one embodiment, the camera readout may be set to a few columns (rows in a 90° rotated camera) at the center of the image plane of the camera. However, reading multiple columns positioned at different spatial locations, as shown in FIG. 6A, increases the horizontal FOV by catching rainbow streaks whose visible spectrum do not intersect with the center column (i.e., the domain of the central ROI). Multiple ROIs also reduces recovery uncertainty since they may increase the signal per point. This occurs when a single rainbow streak has sufficient signal over several ROIs.

In FIG. 6B, the additional left camera images the zeroth-order diffracted light through a cylindrical lens which focuses light in the horizontal axis (producing white streaks). The intersection of the white streaks with the left line sensor yields additional horizontal point coordinate measurements and improves source positioning. In FIG. 6C, a multi-axis diffraction grating additionally yields horizontal rainbow streaks. Capturing these streaks using an additional line sensor mitigates the vertically-overlapping ambiguity of the sources.

Let $I_o^r$ denote the line scan camera image from ROIs indexed r=1, 2, ..., R. When R>1, the network is fed with a concatenation of measurements from all ROIs. Specifically, for sparse points, the R patches $I_o^r[\Omega(y_n)]$ from $y_n$ are concatenated to form an extended 8×9 (R) color patch and feed it to the network, along with $y_n$. For vertical line projection, the RGB measurements $u_y^r$ are similarly concatenated. The resulting (3R+1)×1 vector is fed to the network. As in Eq. (14), only "valid" y's are considered, where now a measurement at y is valid if any one of the R terms $u_y^r$ is valid. To preserve the network's invariance to object albedo, each individual $u_y^r$ is augmented during training (before concatenation). The augmentation consists of a random scale factor, followed by adding simulated sensor noise.

Reducing Sparse Point Uncertainty by Incorporating Additional Sensors

The diffraction-based point positioning system described so far has two limitations: (1) uncertainty in the horizontal coordinates is typically higher than the vertical one; and (2) ambiguities in position estimates for certain source alignments (vertically overlapping sources). Two variations of the hardware system that mitigate these limitations, for the sparse point case will now be described.

Two hardware augmentations are presented: (1) using two line sensors with a diffraction grating and a horizontal cylindrical lens, respectively; and (2) using two line sensors with a double-axis diffraction gratings.

Hardware Augmentation 1: Horizontal Cylindrical Lens

To improve the accuracy of $x^v$, an additional horizontal line scan camera can be positioned such as to image the zero-order component through a cylindrical lens, as shown in FIG. 6B. The cylindrical lens focuses scene points onto vertical lines which intersect the horizontal line sensor. These white streaks yield precise measurement for coordinates $x^v$. However, unlike the rainbow streaks, the white streaks provide no information about $y^v$. Nevertheless, this data can be used to improve 2D positioning.

To accomplish this, let $x_k^v$, denote the recovered cylindrical lens coordinates, indexed by k=1, 2, ..., K. For every recovered point ($x_n^v$, $y_n^v$) the distance of its $x_n^v$ coordinates to all $x_k^v$ are computed. If for any k, $x_k^v$ is within a predefined threshold distance to $x_n^v$ (e.g., below four pixels in one embodiment), it is assumed that measurement k originated from point n, and thus replace $x_n^v \leftrightarrow x_k^v$. On the other hand, if no close match is found for $x_n^v$, ($x_n^v, y_n^v$) is discarded as an inaccurate measurement.

Figure 7:
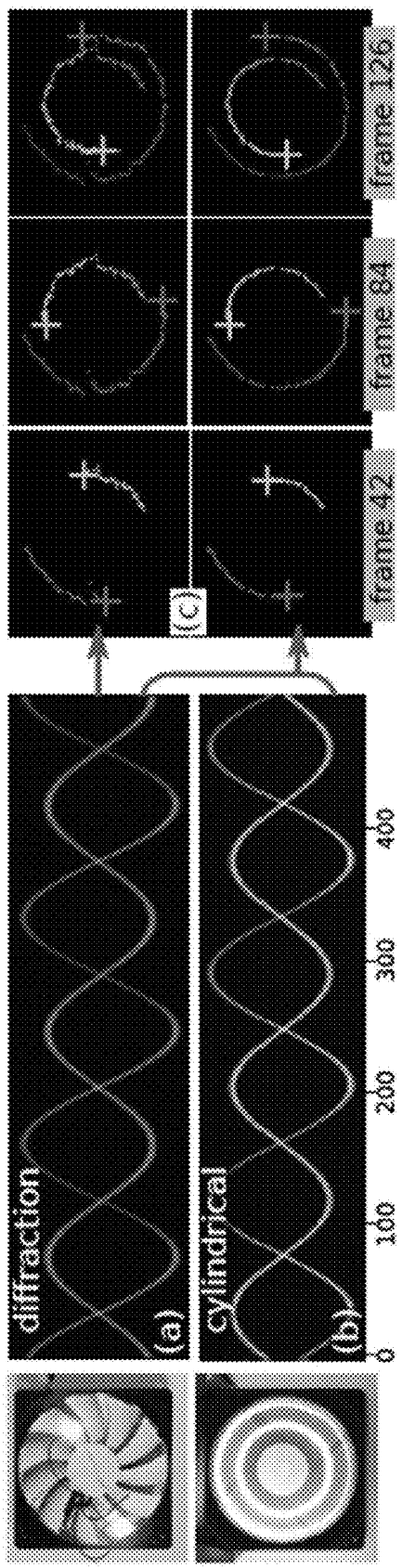
FIG. 7 shows results from the system when applied to high speed operation.

FIG. 7 shows an example of this result. A computer fan mounted with two LEDs at different radii is rotated at 780 RPM. A diffraction-cylindrical system images the fan at 2220 FPS. FIG. 7(a) is a spectral space-time diagram for the diffraction camera where columns show the 1D signal at different times (rows). FIG. 7(b) is a space-time diagram for the additional cylindrical lens camera. FIG. 7(c) shows recovered source positions and trajectories at three times within the first revolution of the fan. The top row of FIG. 7(c) shows results using only the diffraction signal, while the bottom row of FIG. 7(c) shows the improvement by incorporating cylindrical measurements.

Hardware Augmentation #2: Double-Axis Diffraction

The transmissive grating previously discussed has spatial variation in only one axis, thus it diffracts light along that axis. A double-axis grating has spatial variation in both axes (e.g., a star filter) and thus creates diffraction orders in both horizontal and vertical directions. Using a double-axis grating allows for a straightforward generalization of diffraction-based 2D positioning.

The single-axis grating, shown in FIG. 6A can be replaced with a double-axis grating and an additional line sensor camera may be added to image the vertical first-order diffraction component as well, as shown in FIG. 6C. The vertical diffraction component creates a vertical rainbow streak on the second line sensor camera (which now requires no tilting). Each line sensor now provides a separate measurement for ($x^v, y^v$) using the diffraction-based 2D positioning process described above. The process of merging the pair of measurements is straightforward. If two measurements fall within a pre-defined distance E on the virtual image plane, they are assumed to originate from the same scene point and the two measurements are merged by taking the $x^v$ coordinate from the sensor sensing the vertical rainbow streak, and taking the $y^v$ coordinate from the horizontal sensor.

Figure 8:
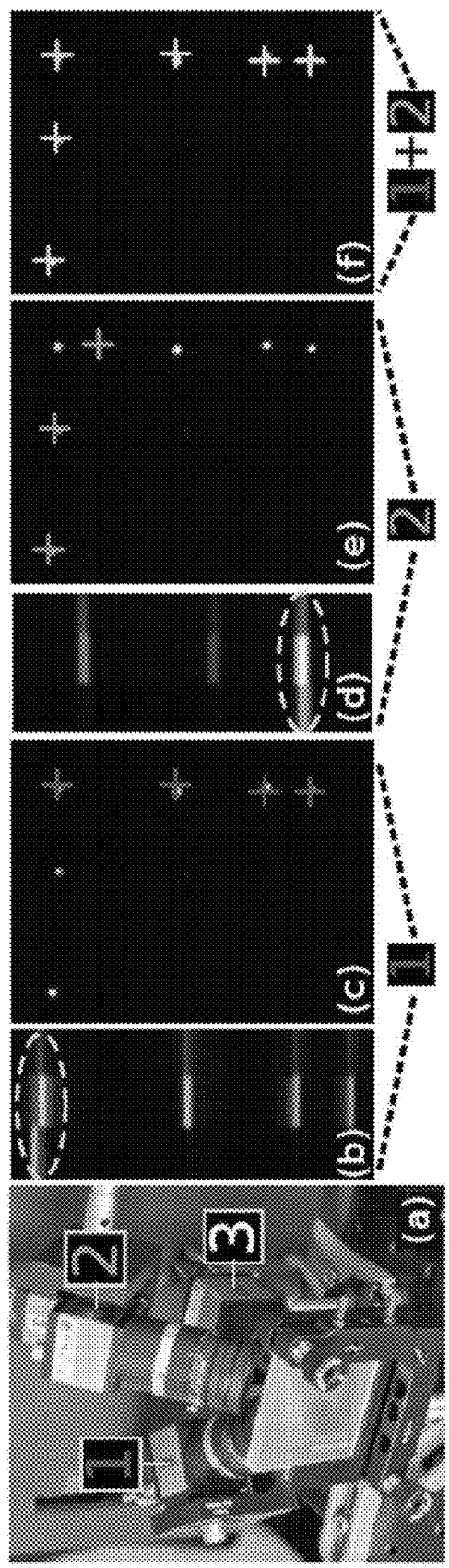
FIG. 8 shows results from a double-axis diffraction system having three ROIs.

FIG. 8 shows an example result. FIG. 8(a) shows a double-axis diffraction system with 3 ROIs. FIG. 8(b), shows the signal from the vertical diffraction (cam 1). FIG. 8(c) shows recovered points from the vertical diffraction superimposed on a 2D helper camera (ground truth, cam 3). Here, the three top points share the same y and thus are not fully recovered. FIG. 8(d) shows the signal from the horizontal diffraction (cam 2). FIG. 8(e) shows recovered points from the horizontal diffraction. Here the right vertical points share the same x and thus are not fully recovered. FIG. 8(f) shows the merging of the double-axis measurements, yielding correct positions for all points.

Hardware and Calibration

A prototype of the invention is shown in FIG. 8(a). The setup consists of three-color cameras. Camera 1 and 2 capture the vertical and horizontal diffraction streaks, respectively. Camera 3 is the helper camera, used for gathering ground-truth training data and visualizations. Camera 3 is also used in conjunction with the horizontal cylindrical lens embodiment. Preferably, the cameras support up to 64 ROIs, thus effectively acting as line scan cameras. At least two rows are required per ROI to yield color measurements (due to Bayer filter). Camera 1 is rotated by 90° to obtain vertical 1D measurements. Cameras 1 and 2 were stripped of their built-in IR filters and mounted with 1.5 MP 9 mm lenses. Camera 3 was mounted with an 8 mm M12 lens using an adapter. The transmission gratings, in one embodiment, are 50 mm, 1200 grooves/mm. In the double-axis diffraction embodiment, all cameras viewed the scene through two stacked gratings, where one is rotated 90° with respect to the other. Otherwise, a single grating was used.

The motion-capture suit and glove prototypes utilize 5 mm 12V white diffuse LEDs. A second glove was fitted with 20 mm 3.3V white LEDs. For 3D scanning, a short throw DLP projector was used.

Calibration is performed using camera 3, whose image plane serves as the virtual image plane shown in FIG. 4. For sparse points, approximately 40K samples of a single moving source using all cameras were simultaneously recorded For sources, three types of LEDs (two clear and one diffuse) were used. This procedure yields the training set of Eq. (12) and is used to compute $H^{-1}$ and G. For 3D scanning, a vertical line on a white wall was swept and imaged. For each projected line, its line equation $y^v=cx^v+d$ is computed and used to determine the ground truth disparity:

$$x^{v,GT}(y) = \frac{[G(y)-d]}{c} \quad (16)$$

Together, all lines yield almost 700K RGBy/position samples. Intrinsic and extrinsic calibration of the helper camera and projector is performed using a checkerboard.

Deconvolving Diffraction for Fast Imaging of Sparse Scenes

The first embodiment previously discussed uses a diffraction grating to spread incident light and encode positions using the spectrum with a line sensor. Diffraction gratings are easily available and have been used for artistic effect, spectroscopy, multi-spectral sensing, and rainbow particle velocimetry. The first embodiment does not require special modulation of sources but instead relies on purely passive observation of sparse scenes and works with traditional CMOS sensors. However, the first embodiment has three important limitations: (a) it focuses only on a line diffraction pattern; (b) its reconstruction works for points that are very sparse and fails in many situations (e.g., points on a uniform grid) where multiple scene points contribute different spectral intensities to the same pixel; and (c) it requires multiple cameras to resolve the position of points reliably.

The first embodiment can be generalized to arbitrary diffraction patterns and arbitrary sensor sampling of the sparse scene point distributions, while using only a single camera. The image formation can be modeled as a spatially-invariant convolution of the diffraction pattern and the sparse scene. The point-spread function (PSF) of the diffraction pattern can be measured for any type of scene point or source. The image is acquired using an arbitrary configuration of ROIs and is deconvolved by enforcing sparsity.

Disclosed herein is a second embodiment comprising a model for recoverability of the sparse scene and an approach to minimize the ROI configuration (and maximize frame rate) based on the diffraction PSF. This embodiment is then extended to scenes with multiple spectra and the sparse scene is estimated using a known dictionary of PSFs. In contrast to the first embodiment, the second embodiment does not require any training data, does not require multiple cameras, applies to more dense scenes, and is not limited to line diffraction gratings/sensors or particular sparse scene configurations.

The second embodiment is applicable in several domains, such as motion capture of fast-moving markers and particle image velocimetry (PIV). The system is composed of an off-the-shelf diffraction grating mounted in front of a single, ordinary 120 Hz camera and is able to accurately capture high speed motions (kHz) such as skipping ropes, bullets from guns, complex fluid vortices, and even sparklers.

While this disclosure primarily demonstrates 2D position estimates of the sparse scene points at high speeds, the second embodiment can be used with multiple cameras and standard 3D estimation pipelines.

Figure 9:
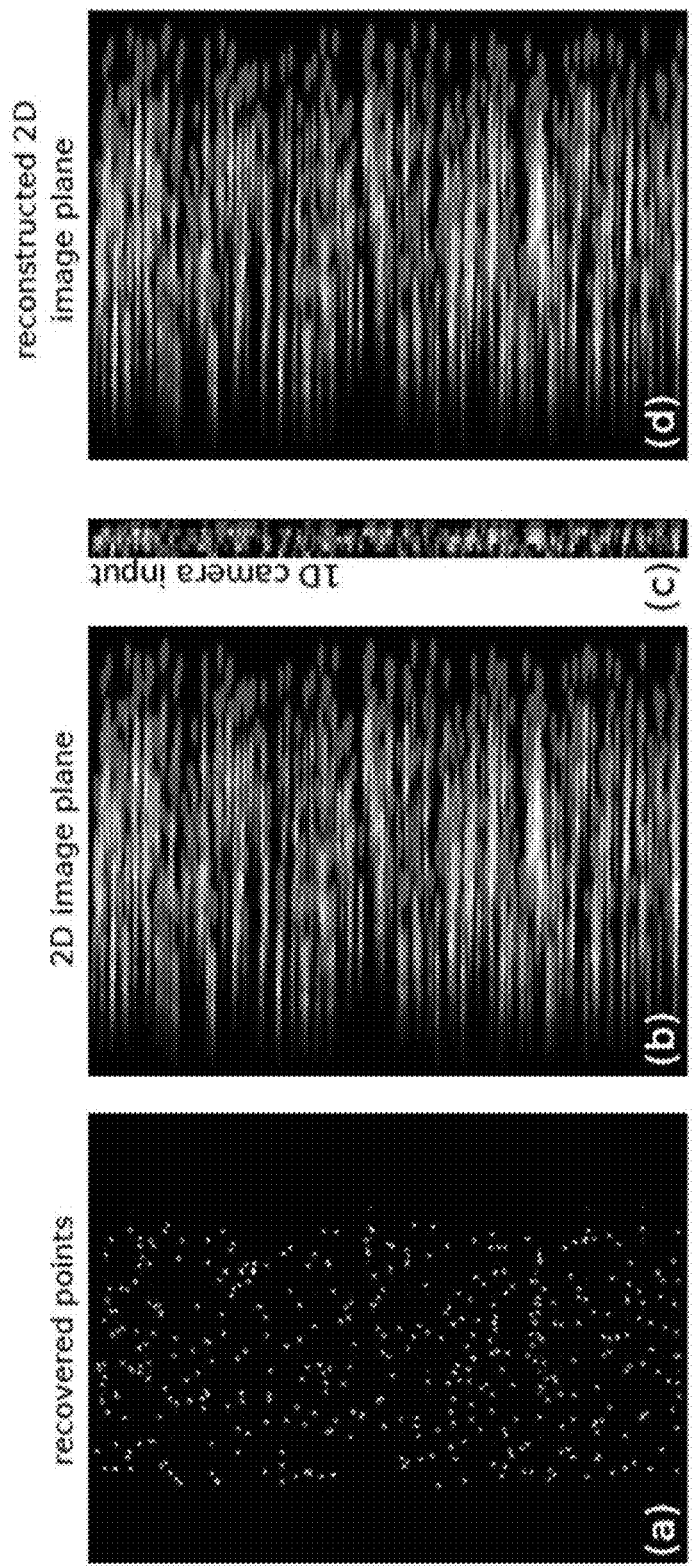
FIG. 9 shows a method for dense scene deconvolution.

As an example, consider an application to directly recover points whose signal is linearly mixed on the line sensor (multiple overlaying points, e.g., light sources that lie on the same row, as shown in FIG. 9). Different recovery methods which rely on a known system point spread function (PSF), such as non-blind deconvolution or convolutional sparse coding, can be used. Handling denser scenes can open the door for additional applications such as fast particle image velocimetry (See FIG. 2C).

FIG. 9 shows dense scene deconvolution. A scene with 400 points is imaged as shown in FIG. 9(a). The ground truth point location is marked by white squares. FIG. 9(b) shows images on the 2D image plane showing the rainbow streaks generated by the points. Here, the density causes many points to lie on the same row, yielding color sensor mixtures. FIG. 9(c) shows signals captured using five ROIs, each having a width of 10 pixels. The recovered point positions from FIG. 9(c) are superimposed in FIG. 9(a) as red squares. FIG. 9(d) shows a 2D image sensor plane reconstructed from the recovered points.

Figure 10:
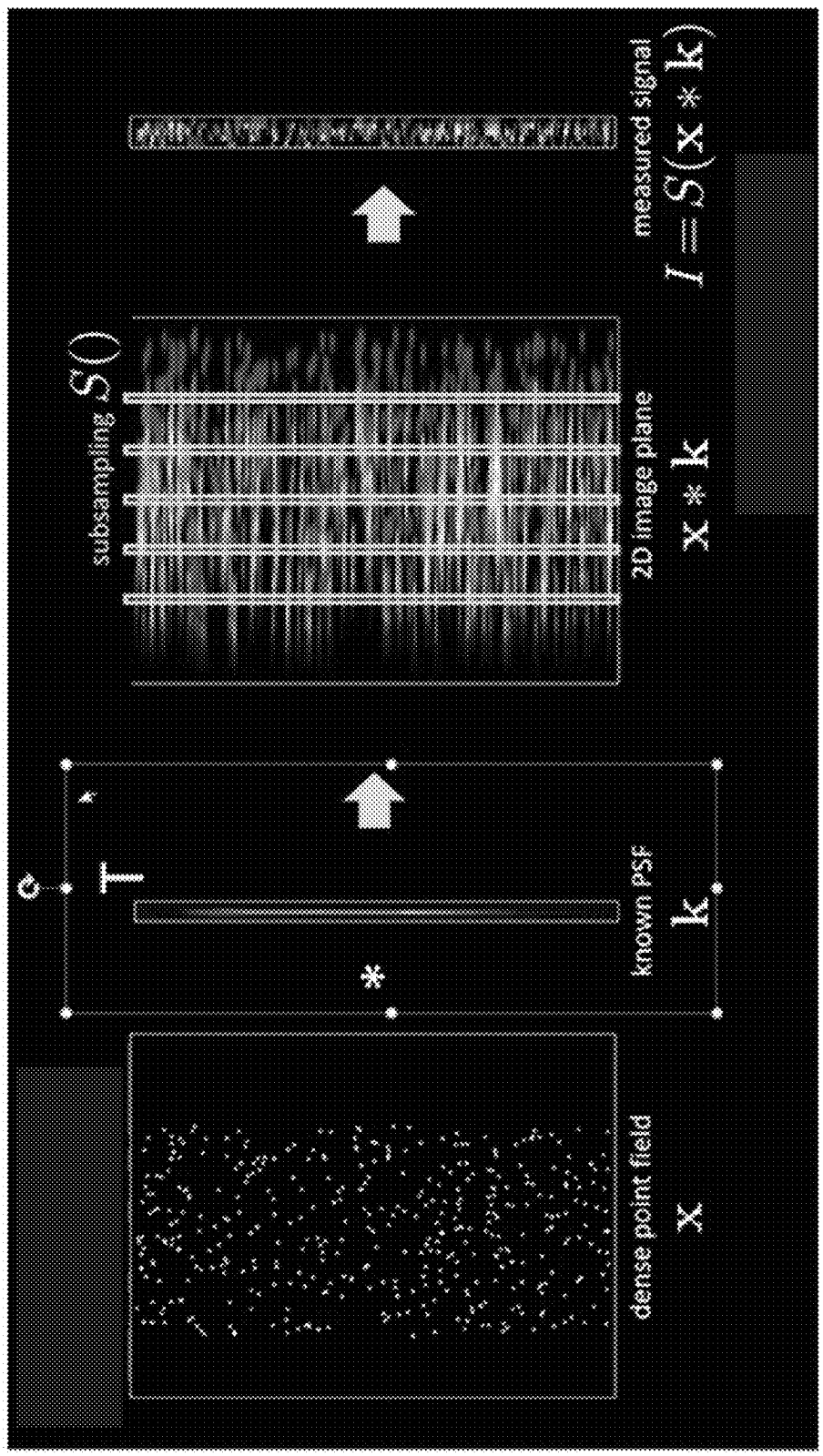
FIG. 10 shows the process for performing the dense scene deconvolution shown in FIG. 9.

FIG. 10 shows the process for performing the dense scene deconvolution shown in FIG. 9. The 2D image plane in FIG. 9(c) is obtained by performing a convolution between the dense point field x of FIG. 9(a) and the point spread function k in FIG. 9(b). The 2D image plane is then sub-sampled for multiple regions of interest to obtain measured signal/shown in FIG. 9(c).

Convolutional Image Formation Model

A diffraction grating is a thin optical element that disperses light as a function of wavelength. When illuminated with a wide spectrum (e.g., white light), the periodic microstructure of a diffraction grating produces rainbow patterns similar to the effect that a prism has on light. Simple periodic structures result in simple patterns that consist of lines, such as the single rainbow streak or a rainbow-colored star, as shown in FIG. 11(B). Presented below is a novel convolutional image formation model for a sparse scene when viewed through such diffractive optics. The model can also support diffractive optical elements (DOEs), which can produce almost any desired light distribution by carefully designing the micro-structure of the optical element.

Figure 11:
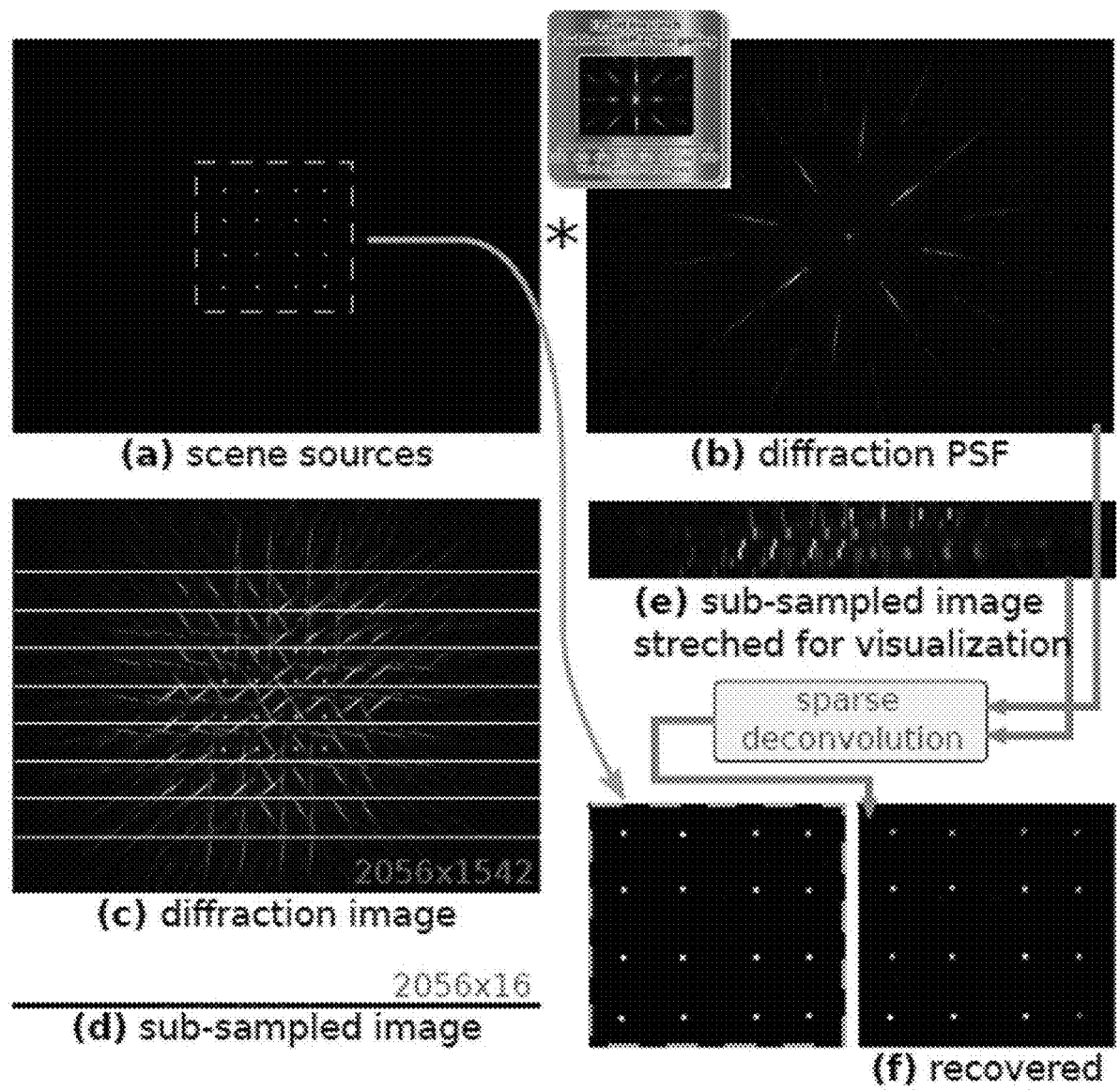
FIG. 11 is a graphical representation of the convolutional image formation and recovery.

FIG. 11 shows the convolutional image formation and recovery. In FIG. 11(a), an image of a 4×4 LED matrix is captured using a standard 2D camera. FIG. 11(b) shows that, when the image is imaged through a double-axis diffraction grating (inset), a single LED's point spread function (PSF) has the shape of a rainbow-colored star spanning a large part of the image domain. FIG. 11(c) shows the LED matrix of FIG. 11(a) imaged through the diffraction star grating. The resulting image can be modeled as a convolution of the standard 2D frame in FIG. 11(a) with the individual LED PSF in FIG. 11(b). FIG. 11(d) shows the 2D image sub-sampled by taking eight narrow slices of size 2056×2 regions of interest (marked by yellow lines) to yield this sub-sampled image. FIG. 11(e) shows the sub-sampled image of FIG. 11(c) vertically stretched for visualization. In FIG. 11(f), the sub-sampled image is used with the LED PSF to yield a reconstruction of the full 2D frame.

Let $\delta(s)$ denote the image of a single bright scene point mapped to a single pixel s. Note that $\delta(s)$ is an intensity-only image of the point, where the intensity value at s can take arbitrary values. If the scene consists of multiple points that emit the same normalized spectrum of light, the resulting image, shown in FIG. 11(a), is given by:

$$I = \sum_s \delta(s) \quad (17)$$

When placed in front of a camera, the diffraction grating blurs the image with a rainbow-colored point spread function (PSF). If s is the center of the frame, the result of imaging δ(s) is the PSF itself, as example of which is shown in FIG. 11(b). When viewing the scene through the diffraction grating with a plurality of points, the image formation process can be modeled as a convolution between I and the PSF $h_\sigma^{diff}$ of the diffraction grating:

$$I_\sigma^{diff} = I * h_\sigma^{diff} \tag{18}$$

where σ represents the different color channels of a camera. As shown in FIG. 11(c), the resulting "diffraction" image consists of a superposition of multiple copies of the diffraction PSF, shifted to the scene point positions and scaled by the intensity of each point. As a comparison, the first embodiment assumed a scene with no such superposition, limiting the possible scenarios to which the first embodiment may be applied.

Capturing a full-frame video stream with a conventional sensor at high frame rates is limited by bandwidth. Instead, the approach of the second embodiment is to recover a full frame image/from a sparse set of measurements on the sensor, modeled as:

$$I_\sigma^{sparse} = W_\sigma \odot I_\sigma^{diff} = W_\sigma \odot (I * h_\sigma^{diff}) \tag{19}$$

where:
the operator ⊙ denotes an element-wise Hadamard product; and the matrix is a binary sampling matrix with ones for sampled pixels and zeros otherwise.

Note that $W_\sigma$ can vary per color channel σ (e.g., to encode the Bayer color filter array associated with most cameras). Although both $I_\sigma^{sparse}$ and I are represented here as having the same size, the image $I_\sigma^{sparse}$ requires far less bandwidth because $W_\sigma$ is sparse, and only a small subset of camera pixels are needed to populate $I_\sigma^{sparse}$.

For example, FIGS. 11(c-d) sub-samples 16 of 1542 rows, reducing the bandwidth of the video stream by a factor of nearly 100.

Recovering the Sparse Scene

I can now be recovered from the sparsely sampled sensor measurements $I_\sigma^{sparse}$. Here, it is assumed that the PSF $h_\sigma^{diff}$ is known and may be acquired through a calibration procedure. Image I encodes two pieces of information about each scene point: intensity and position on the image plane. Some of the applications, for example, motion capture with markers and PIV, are concerned with only the point positions. In this section, a general method for recovering I is first provided, followed by a discussion about the conditions for which the approach can yield precise point positioning.

In the general case, a plurality of scene points yield a mixture of point PSFs on the sensor. Coupled with image noise, this makes a direct deconvolution of Eq. (19) an under-determined problem. Therefore, the reconstruction can be formulated as an optimization:

$$\operatorname*{argmin}_{I} \frac{1}{2} \sum_\sigma \| W_\sigma \odot (I * h_\sigma^{diff}) - I_\sigma^{sparse} \|_2^2 + \gamma \| I \|_1 \tag{20}$$

where, the first term is the data fidelity term, the second term is a sparsity enforcing regularization term, and the scalar controls the contribution of the regularizer. This is a convex optimization problem that can be solved with readily available software packages.

Extension to Multiple Spectra

It was previously assumed that all scene points share the same reflectance spectrum. This allows the image formation model to be the convolution between an intensity-only image and a diffraction PSF, as shown in Eq. (18). However, general scenes can contain a variety of sources, each emitting or reflecting a unique spectrum. The image formation can therefore be extended model to handle multiple spectra and generalize the corresponding reconstruction procedure.

Suppose the reflectance spectrum of each scene point can be described as a linear combination of K reflectance spectra. For example, the scene shown in FIG. 12(a) contains LEDs of four different colors, each having a unique spectrum. Let $h_{\sigma,k}^{diff}$ denote the PSF of a scene point having reflectance spectra k=1, 2, . . . , K. Then the resulting sub-sampled image can be modeled as:

$$I_\sigma^{sparse} = W_\sigma \odot \sum_{k=1}^{K} (I_k * h_{\sigma,k}^{diff}) \tag{21}$$

The image $I_k$ denotes the contribution that spectrum k has to the signal at every pixel. In other words, each camera pixel can be dominated by a single spectrum coefficient k or be a mixture of several coefficients. The signal can then be reconstructed by optimizing the following:

$$\operatorname*{argmin}_{I_1,\ldots,I_K} \frac{1}{2} \sum_\sigma \left\| W_\sigma \left( \sum_{k=1}^{K} I_k * h_{\sigma,k}^{diff} \right) - I_\sigma^{sparse} \right\|_2^2 + \gamma \sum_{k=1}^{K} \| I_k \|_1 \tag{22}$$

Figure 12:
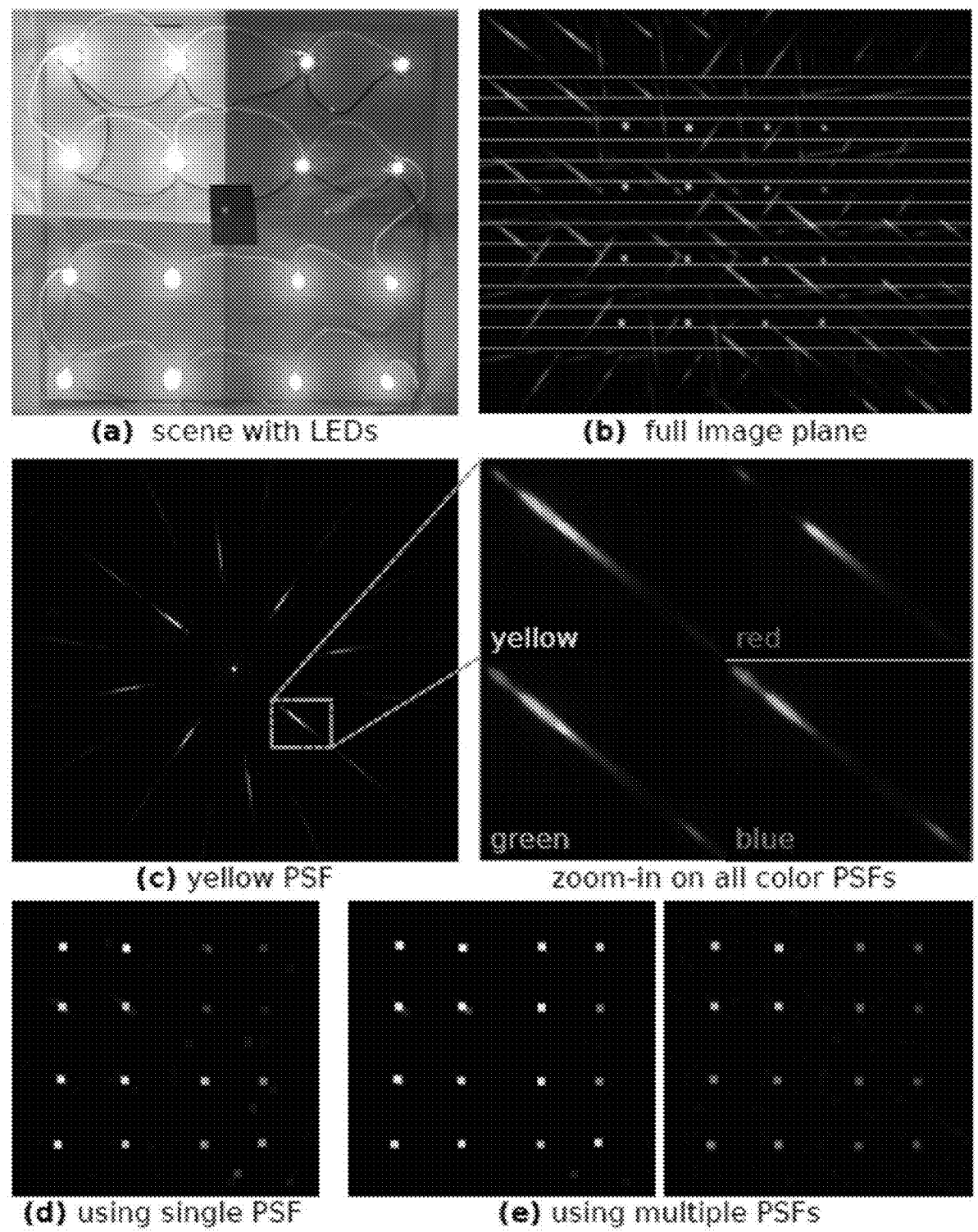
FIG. 12 graphically shows the recovery of sources of multiple spectra.

An experiment showing a scene having K=4 sources with measured PSFs is shown in FIG. 12.

FIG. 12 shows the recovery of sources of multiple spectra. FIG. 12(a) shows wherein a scene with 16 LEDs of four different colors is imaged using a double-axis diffraction grating. In FIG. 12(b), the 2D sensor plane is sampled using 14 two-pixel wide regions of interest (ROIs) illustrated by the yellow horizontal lines. FIG. 12(c) shows that each LED yields a star PSF in the image of FIG. 11(b) whose spectrum depends on the LED color. A close-up of a single diffraction mode of the four scene spectra is shown on the right. FIG. 11(d) shows scene recovery using Eq. (20) and a single PSF. FIG. 11(e) shows scene recovery using a dictionary of the four scene PSFs with Eq. (22).

Note that the single-dictionary recovery yields degraded results, while using multiple dictionaries improves the recovery. A by-product of Eq. (22) are the individual coefficient weights of each PSF, visualized using the appropriate LED color on the right.

Domain of Position Recoverability

The above reconstruction algorithm handles an arbitrary sampling matrix, as well as an arbitrary PSF. However, not all PSF and sampling matrix combinations yield the same accuracy when recovering point positions from I. How the properties of the PSF constrain the sensor sampling choice is discussed below.

Consider a scene containing a single point mapping to pixel s. The point's image plane position can be uniquely recovered for an arbitrary PSF and sensor sampling matrix over an image domain, if there exists an injective function $f$ that maps the sampled and shifted PSF to its positional value s in this domain:

$$f(W_\sigma \odot [\delta(s) * h_\sigma^{diff}]) \longmapsto s, \forall s \in \Omega \tag{23}$$

Figure 13:
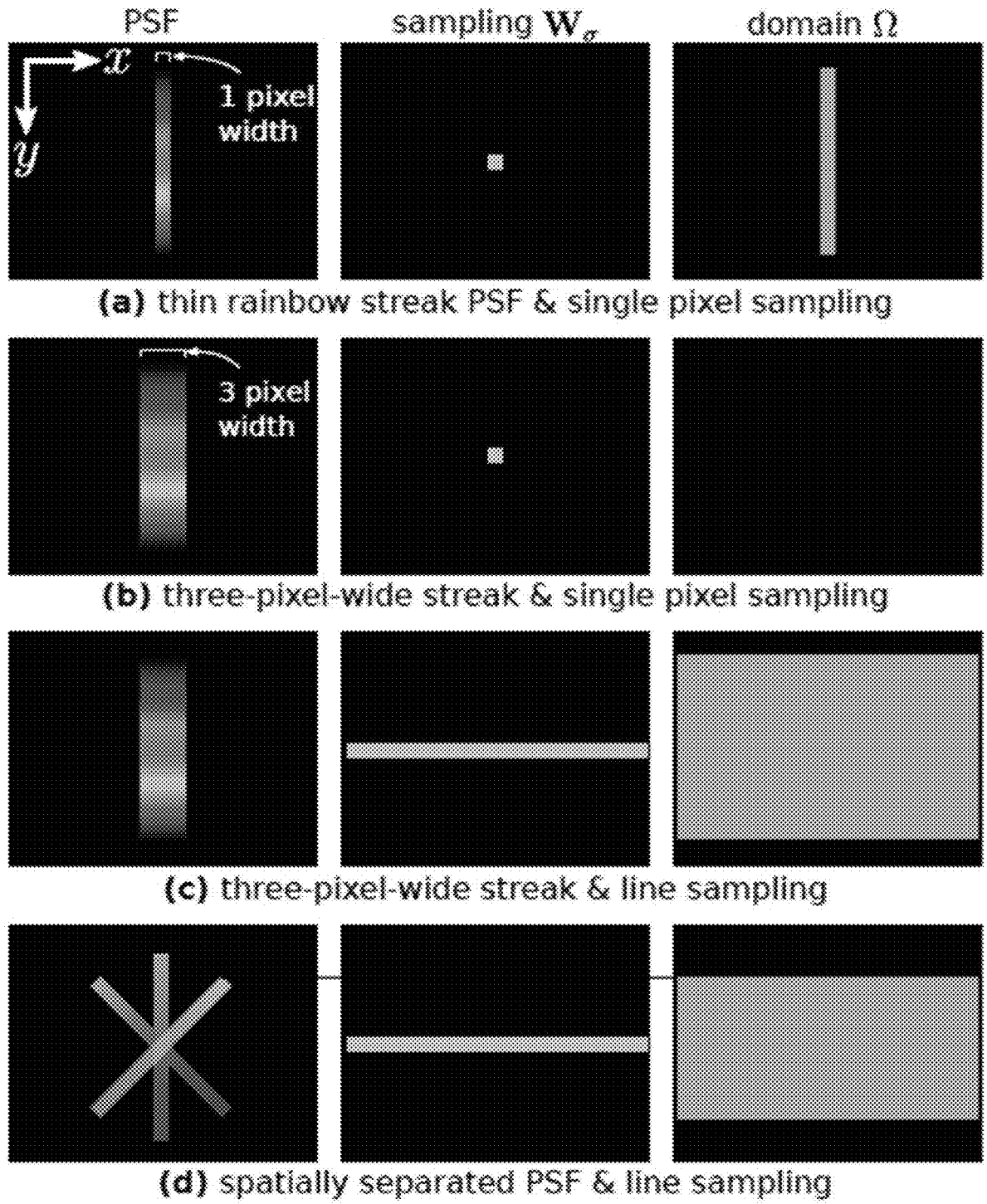
FIG. 13 graphically shows the effect of PSF and sensor sampling on position recovery.

FIG. 13 shows the effect of PSF and sensor sampling on position recovery. The image domain Ω for which point positions can be recovered uniquely depends on the PSF and the sensor sampling matrix. In FIG. 13(a), a vertical one-pixel wide rainbow PSF sampled using a single camera pixel defines a vertical recoverable domain with the same spatial support as the non-zero PSF pixels. FIG. 13(b) shows that by increasing the PSF width to three pixels, a single pixel sampling can no longer determine s precisely anywhere in the image domain. This is because the vertical (y-axis) position can still be determined with certainty, but now a two-pixel ambiguity exists in the horizontal position. FIG. 13(c) shows that sampling the entire row resolves the horizontal position ambiguity, showing that different $W_\sigma$ yield different $\Omega$ for the same PSF. FIG. 13(d) shows that the PSF need not be a single rainbow line. In this example, the PSF shift can be computed using the ratios between the different RGB channels as in FIGS. 13(a-c). However, here these measurements are spatially separated across different columns of the sampling row.

Figure 14:
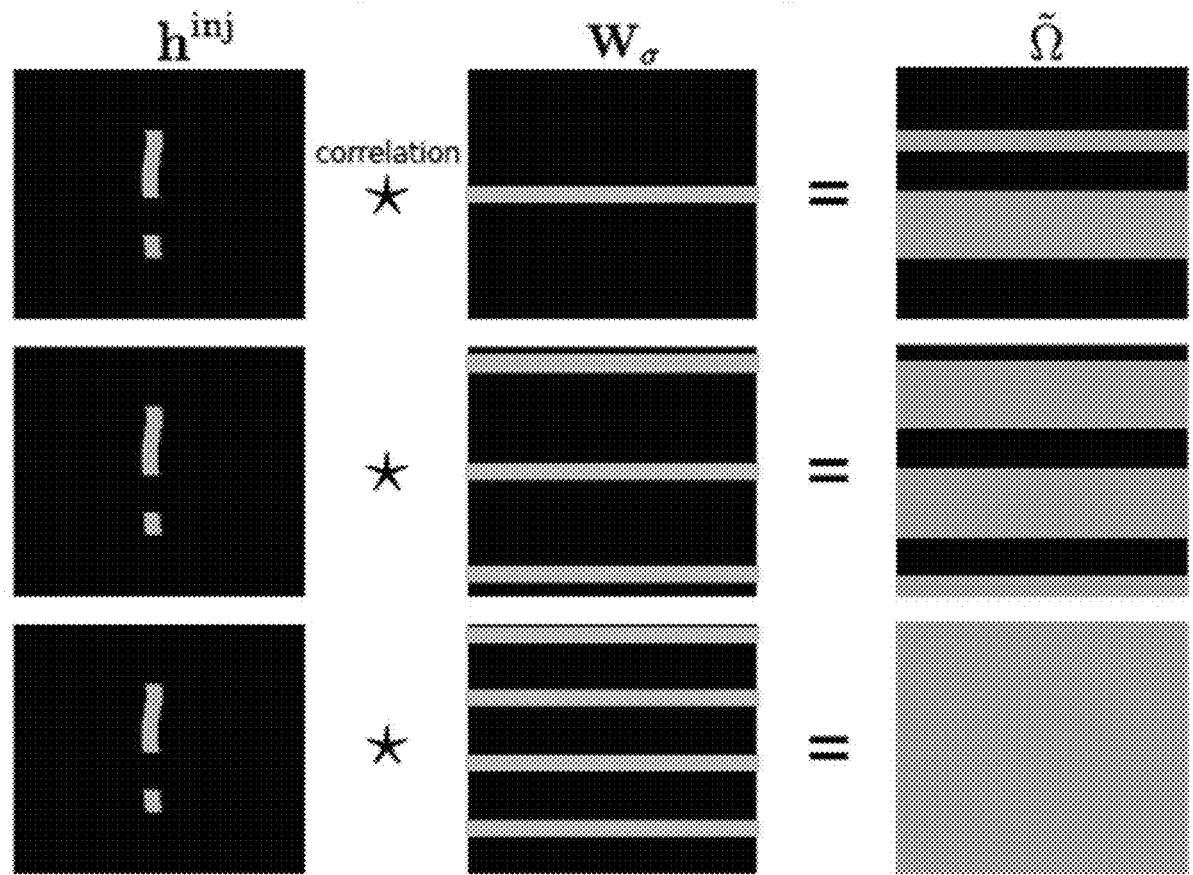
FIG. 14 graphically shows the process of estimating the uniquely recoverable domain.

FIG. 13 also illustrates various cases of the dependence of $\Omega$ on the PSF and $W_\sigma$. FIGS. 13(b, c) illustrate that the same PSF can yield an empty uniquely-recoverable domain or a uniquely-recoverable domain that spans the entire image plane. Specifically, the single pixel sampling in FIG. 13(b) can yield point positioning with an ambiguity of two horizontal pixels, while the line sampling shown in FIG. 13(c) yields no horizontal or vertical position ambiguity. A PSF and a sampling matrix that maximize the support of $\Omega$. Eq. (23) states an implicit condition for defining $\Omega$, but does not provide a method for computing it given a PSF and Next, a method for estimating $\Omega$ for a subset of PSFs that fulfill a stronger condition is provided, the condition being that the PSF image itself contains individual pixels that define an injective function from their intensity-scaled color channel (e.g. RGB) values to their position. The method is illustrated in FIG. 14, which shows estimating the uniquely recoverable domain. Given a PSF and a sensor sampling matrix $W_\sigma$, the uniquely-recoverable domain can be approximated by the following procedure: First, estimate the PSF's injective pixel domain $h^{inj}$ as shown in FIG. 14(a). Next, correlate $h^{inj}$ with $W_\sigma$ to yield $\tilde{\Omega}$. FIG. 14(b) illustrates this process for choosing the ROIs' pitch P for a uniform horizontal sampling of the image plane.

Let $h^{inj}$ denote a binary image with a domain Y over which there exists an injective function g:

$$g(\alpha h_\sigma^{diff}[x]) \rightarrowtail x, \forall x \in \Gamma \quad (24)$$

Here, x is an image pixel, and a is an arbitrary scaling factor representing the intensity of the system's PSF. For example, the injective PSF domain of a thin diffraction rainbow line, shown in FIG. 13(a), is approximately an image line where the camera response function yields unique color channel values in response to the incident light spectrum. Thus, given $h^{inj}$, the recoverable domain can be estimated by computing its image domain support using $W_\sigma$:

$$\tilde{\Omega}\{x | (W_\sigma * h^{inj})[x] > 0\} \quad (25)$$

where "*" denotes the correlation operator. Note that Eq. (25) constitutes a sufficient but not necessary condition for $\Omega$ and thus $\tilde{\Omega} \subseteq \Omega$. As shown in FIG. 13(c), a PSF may have $\Gamma = \emptyset$ (because no single pixel in the PSF directly yields a precise shift position) yet still yield unique recoverability over the entire image domain.

Choosing $W_\sigma$ Using Camera ROIs

Many machine vision cameras allow defining multiple regions of interests (ROIs) for which to perform sensor read-out. The output image is then a concatenation of the ROIs of choice, as shown in FIGS. 11(c-d). A ROI is defined as a rectangle in the image plane. As most cameras perform readout sequentially one row at a time, the capture speed usually depends on the total number of rows in all the defined ROIs.

Given these hardware constraints, the sampling matrix $W_\sigma$ consists of multiple ROIs of size 2056×M, where M is the vertical width of each ROI. The multiple ROIs are repeated vertically every P pixels. Thus, the image sub-sampling factor is P/M. Higher sub-sampling factors result in faster frame rates.

Maximizing the sub-sampling factor requires maximizing P while minimizing M. This can be achieved by setting M to its minimal allowable value (e.g. 2 pixels for some cameras) while finding the highest $P = P_{max}$ such that $\Omega$ covers the entire image domain (field-of-view). To find $P_{max}$, the PSF's injective domain $h^{inj}$ is estimated and Eq. (25) is used to search for the maximal pitch $P_{max}$.

The diffraction line imaging of the first embodiment has been generalized to handle an arbitrary sensor sampling combined with an arbitrary diffractive element. A system implementing the second embodiment is easily assembled, requiring just a single diffractive optical element mounted in front of one camera. Calibration is fast and straightforward, requiring a single capture of the scene's PSF. The reconstruction algorithm requires no prior data-set for training. There is a trade-off between the different choices of PSF, created by using different diffractive optics. A single-axis diffraction grating is energy efficient because most of the light's power is concerted in a single diffraction mode (i.e., the rainbow streak or line). However, the single-axis PSF of the first embodiment yields higher positioning uncertainty in the vertical axis, and has a limited injective domain, which reduces the sub-sampling factor. Conversely, the "star" PSF shown in FIG. 11(b) and FIG. 12(c) has a large spatial support and contains rainbow streaks in both axes. It therefore provides accurate localization in both spatial coordinates and enables high sensor sub-sampling factors, typically upwards of 100. However, its spatial spread comes at the cost of light efficiency, making it mostly useful for high-speed imaging of relatively bright sources such as LEDs and car headlights.

Diffraction-based imaging assumes sparsity in the scene points or sources. As the scene becomes dense a lower sub-sampling factor is required for accurate point positioning. A higher sensor sampling increases the signal, making the optimization more robust to noise and signal saturation. In some embodiments, 8 ROIs were used. The sub-sampling factor was decreased by increasing the width of each ROI while still maintaining the desired capture speed.

The performance of the second embodiment depends on the system's hardware components: camera, diffractive optics, and illumination source. Recent experimental cameras that allow an arbitrary sampling of the sensor plane may yield higher performance by designing more efficient sampling matrices. Conversely, improved performance can be obtained by designing custom diffractive optical elements that yield a PSF with superior performance. For instance, the star PSF used herein can be improved by concentrating most of the energy in just two diffraction modes (rainbow lines): one horizontal line and one vertical line, with minimal energy along the rest of the directions. Finally, incorporating a learning-based component to position recovery may further improve point positioning by learning and denoising the PSF-specific artifacts that result in the reconstructed frames. In conclusion, the second embodiment has the potential to allow high-speed capture of sparse scenes in various applications.

EXTENSIONS AND IMPROVEMENTS

The underlying principle for diffraction line sensing can be further improved by using different imaging systems. The principle can be applied to light sources at non-visible wavelengths coupled with the appropriate diffractive optics and cameras. Using prisms instead of diffraction gratings can improve light efficiency for the single-diffraction system. Moreover, designing custom diffractive elements whose PSF is more sensitive to horizontal motion may yield better accuracy for recovering the virtual x-coordinates.

Diffraction line imaging is a novel imaging principle relying on light diffraction and 1D sensing. Using the principle, proof of concepts for applications such as motion capture of uncontrolled and unmodulated LED lights, tracking car headlights and structured light 3D line scanning have been demonstrated. A key advantage of using line sensors is speed. Speed is crucial for motion capture because it greatly eases tracking. For 3D scanning, speed is essential when scanning moving objects (e.g., an industrial conveyor belt). The invention uses multiple rows from a conventional 2D sensor by configuring the ROI to mimic a line sensor, resulting in fast readout rates of up to 2220 FPS. Higher-speed line sensors could increase the frame rate up to 45,000 FPS (×20 Faster than the current embodiments) and improve light efficiency with large pixels up to 4×32 microns in size (×10 larger).

Conversely, using 2D sensors with multiple ROIs allows for smooth control over the speed vs. quality trade-off, namely, additional ROIs reduce speed but increase accuracy. As with any sensor, performance is dependent on the available signal-to-noise ratio (SNR). The SNR of systems depends on the sensor's spectral response.

Thus, hyper-spectral sensors whose pixel's spectral response is less limited than that of the standard RGB sensor can boost performance. For 3D scanning, bright broadband sources, such as LEDs or supercontinuum/swept-frequency lasers can additionally increase SNR many-fold. Learning-based or dictionary-based approaches may be employed to improve reconstruction quality by extracting multiple vertically overlapping points, which yield a linear color mixture on the 1D line scan sensor.

The calculations required to implement the above-described invention can be accomplished using a processor coupled with one or more light sensors and executing software comprising instructions to read the necessary data from the one or more light sensors and calculate the results in accordance with the equations contained in the description of the invention. Specific implementations of the software are not provided herein as any architecture or organization for the software producing the desired results can be used.

In another embodiment of the invention, the methods disclosed herein may be used to detect vibrational modes of one or more objects-of-interest in the scene. The row delay in the rolling shutter of a camera may be used as an alternative way for generating a burst of very high-speed samples. In a rolling shutter sensor, the sensor rows are exposed one after the other with a very short delay. Thus, when capturing a scene having sparse sources through a diffraction grating with a rolling shutter sensor, the motion of the sources will be encoded in the individual sensor rows of a single rolling shutter frame. This setup can be used for vibration detection by imaging one or more retro-reflective markers, placed on objects-of-interest in the scene. The vibration of each marker can be detected by observing the deformation of its respective point spread function. Specifically, the imaged point spread function will exhibit a periodic deformation which encodes the frequency and amplitude of vibrations of the object-of-interest to which the retro-reflective marker that generated the point spread function is attached.

The deformation of the point spread function can be optically magnified with cylindrical optics, wherein each image axis is optically magnified by a different factor. For example, for a vertical diffraction streak point spread function, the horizontal image dimension can be magnified to increase the PSF deformation along the horizontal axis while keeping the vertical axis magnification as is. To acquire the deformation of multiple scene markers using the non-uniform magnification described above, additional optics can be used to overlay the magnified point-spread functions from different markers onto the single 2d image plane, yielding a mixture of the magnified deformed PSFs in each frame.

The invention has been explained in terms of specific embodiments, including specific methods, components and configurations of components. As may be realized, the scope of the invention is not meant to be limited by the exemplary embodiments described herein but is set forth in the following claims. Further, although the invention has been explained largely in terms of using diffraction gratings, it should be realized that prisms could be used in lieu of diffraction gratings to generate the component spectrums of the light sources.

The invention claimed is:

1. A method for determining the spatial coordinates of light sources in a scene comprising:
   separating incident light from each light source to yield a spectral point-spread function on a 2d image plane;
   sampling one or more regions of interest from the 2d image plane; and
   determining the spatial coordinates of the light sources based on measured values of one or more sensor pixels in the one or more regions of interest.

2. The method of claim 1:
   wherein the spectral point-spread function is aligned along an X-axis of the 2d image plane;
   wherein the one or more regions of interest is a single region of interest oriented along a Y-axis of the 2d plane;
   wherein a Y-coordinate of the light source is determined based on the Y position of one or more pixels of interest in the region of interest; and
   wherein an X-coordinate of the light source is determined based on a measured color of the one or more pixels of interest.

3. The method of claim 1 wherein the light source is separated into a spectral point spread function by a diffraction grating or a prism.

4. The method of claim 1 wherein the region of interest is a single line of pixels.

5. The method of claim 1 wherein the wavelength of the pixels of interest is indicative of the angle of incidence of the light from the light source.

6. The method of claim 5 further comprising:
   calculating the X-coordinate of the light source based on the determined angle of incidence of the light.

7. The method of claim 3 wherein light having the same angle of diffraction as the light exits the diffraction grating or prism is focused on a corresponding pixel of interest.

8. The method of claim 1 wherein the light source is a broadband light source.

9. The method of claim 1 wherein the imaging is passive imaging.

10. The method of claim 1 wherein the imaging is structured imaging further comprising:
sweeping a plane of light across a scene containing an object to illuminate a line on the surface of the object;
wherein the light source is the illuminated line on the surface of the object.

11. The method of claim 1 further comprising:
scanning the region of interest across a scene containing one or more light sources.

12. The method of claim 11 wherein the one or more light sources are moving.

13. The method of claim 1 wherein the angle of incidence is calculated by the equation:

$$\theta_i(\lambda) = \sin^{-1}\left(\sin(\theta') - \frac{\lambda}{d}\right)$$

wherein:
$\theta'$ is the angle of diffraction at the imaged diffraction order; and
$d$ is the distance between periodic structure in the diffraction grating.

14. The method of claim 12 wherein the pixels of interest are imaged at the first diffraction order.

15. The method of claim 1 wherein a scene comprises a plurality of sparse light sources, further comprising:
training a convolutional neural network to take as input RBG data and output a discrete set of possible X-coordinates of the light source.

16. The method of 1 wherein multiple regions of interest are imaged.

17. The method of claim 1 wherein the region of interest comprises a plurality of lines of pixels.

18. The method of claim 1 further comprising:
imaging a zero-order component of the light source using a cylindrical lens to produce a broadband line indicating the X-coordinate of the light source.

19. The method of claim 18 further comprising:
comparing a first X-coordinate of the light source calculated based on the wavelength with a second X-coordinate determined from the broadband line from the cylindrical lens;
determining that the second X-coordinate is with a predefined distance of the first X-coordinate; and
using the second X-coordinate as the X-coordinate of the light source.

20. The method of claim 1 wherein separating incident light from the light source into a spectral point-spread function on the 2d image plane further comprises:
performing a convolution between each light source and the point spread function to model the 2d image plane.

21. The method of claim 20 wherein imaging one or more regions of interest further comprises:
obtaining a sparse image by sub-sampling multiple regions of interest in the 2d image plane.

22. The method of claim 21 wherein determining the spatial coordinates of the light sources further comprises:
deconvolving the sparse image.

23. The method of claim 22 wherein the deconvolution of the sparse image is formulated as a convolutional basis pursuit optimization problem where the energy functional consists of a data fidelity term with a sparsity-promoting regularization term.

24. The method of claim 22 wherein the light sources have varying reflectance spectra.

25. The method of claim 24 wherein the 2d image plane model comprises a convolution between the scene and the point spread function and is a sum of convolutions of multiple reflectance spectra for each light source in the scene.

26. The method of claim 20 wherein the point spread function is dependent on a diffraction grating used to separate the incident light from the light sources.

27. The method of claim 20 wherein the scene comprises a dense arrangement of light sources.

28. The method of claim 3 wherein the 2d image plane is imaged using a rolling shutter sensor.

29. The method of claim 28 wherein one or more of the light sources from which the spectral point spread functions are derived comprise light received from a retro-reflective marker on one or more respective objects-of-interest in the scene.

30. The method of claim 29 wherein deformation of the spectral point spread function of each light source is used to compute a temporal frequency, amplitude and phase of a vibration of the respective object-of-interest generating the deformed spectral point spread function.

31. The method of claim 30 wherein the one or more spectral point spread functions are magnified using optics that overlay multiple spectral point spread functions on the 2d image plane.

32. A method for determining an X-Y position of a light source in a 2d plane comprising:
allowing light from the light source to pass through a double-axis diffraction grating;
imaging a Y-oriented region of interest;
determining an X-coordinate of the light source based on the wavelength of one or more pixels of interest in the Y-oriented region of interest;
imaging an X-oriented region of interest; and
determining a Y-coordinate of the light source based on the wavelength of one or more pixels of interest in the X-oriented region of interest.

33. The method of claim 32 further comprising:
determining that the X-coordinate and Y-coordinate are with a predefined distance within the 2d image plane; and
merging the X-coordinate and Y-coordinate to produce the X-Y position of the light source in the 2d plane.

34. A system for determining an X-Y position of a light source in a 2d plane comprising:
a diffraction grating or prism aligned with a Y-axis of the 2d plane;
a sensor for imaging a region of interest along the Y-axis; and
a processor in communication with the sensor and executing software performing the functions of:
reading image data from the sensor;
determining a Y-coordinate of the light source based on the Y position of one or more pixels of interest in the region of interest; and
determining an X-coordinate of the light source based on the wavelength of the one or more pixels of interest.

35. A system for determining an X-Y position of a light source in a 2d plane comprising:
a double axis diffraction grating having axes aligned with the X and Y axes of the 2d plane;
a first sensor for imaging a Y-oriented region of interest;

a second sensor for imaging an X-oriented region of interest; and a processor in communication with the first and second sensors and executing software performing the functions of:
  reading image data from the first and second sensors;
  calculating an X-coordinate of the light source based on the wavelength of one or more pixels of interest in the Y-oriented region of interest;
  calculating a Y-coordinate of the light source based on the wavelength of one or more pixels of interest in the X-oriented region of interest;
  determining that the X-coordinate and Y-coordinate are with a predefined distance within the 2d image plane; and
  merging the X-coordinate and Y-coordinate to produce the X-Y position of the light source in the 2d plane.

* * * * *